(12) United States Patent
Miyoshi et al.

(10) Patent No.: US 9,604,696 B2
(45) Date of Patent: Mar. 28, 2017

(54) BICYCLE CONTROL DEVICE, MOTOR ASSIST BICYCLE INCLUDING BICYCLE CONTROL DEVICE, AND METHOD OF CONTROLLING MOTOR OF MOTOR ASSIST BICYCLE

(71) Applicant: Shimano Inc., Sakai, Osaka (JP)

(72) Inventors: Hiroyuki Miyoshi, Sakai (JP); Jun Gao, Sakai (JP); Makoto Usui, Sakai (JP); Yasuhiro Tsuchizawa, Sakai (JP)

(73) Assignee: SHIMANO INC., Osaka (JP)

( * ) Notice: Subject to any disclaimer, the term of this patent is extended or adjusted under 35 U.S.C. 154(b) by 0 days.

(21) Appl. No.: 14/745,479

(22) Filed: Jun. 22, 2015

(65) Prior Publication Data

US 2016/0016638 A1    Jan. 21, 2016

(30) Foreign Application Priority Data

Jul. 17, 2014    (JP) ................................ 2014-146950

(51) Int. Cl.
*B60L 9/00* (2006.01)
*B62M 6/60* (2010.01)
*B62M 6/45* (2010.01)
*B62M 6/55* (2010.01)
*B62K 23/02* (2006.01)

(52) U.S. Cl.
CPC ............. *B62M 6/45* (2013.01); *B62K 23/02* (2013.01); *B62M 6/55* (2013.01)

(58) Field of Classification Search
USPC ........................................ 701/22; 180/206.5
See application file for complete search history.

(56) References Cited

U.S. PATENT DOCUMENTS

| 5,857,537 A * | 1/1999 | Matsumoto | B62M 6/60 180/206.2 |
| 6,247,548 B1 * | 6/2001 | Hayashi | B60L 11/1801 180/206.2 |
| 6,580,188 B2 * | 6/2003 | Katagiri | B60L 11/1801 180/65.26 |
| 7,040,441 B1 * | 5/2006 | Karaba | B62M 6/20 180/205.6 |
| 7,299,115 B2 * | 11/2007 | Honda | B62M 7/12 180/220 |
| 2002/0128106 A1 * | 9/2002 | Kitamura | B62K 25/04 475/2 |
| 2003/0047369 A1 * | 3/2003 | Katagiri | B60L 11/1801 180/206.2 |

(Continued)

FOREIGN PATENT DOCUMENTS

| JP | 04-358988 A | 12/1992 |
| JP | 5-75086 U | 10/1993 |

(Continued)

OTHER PUBLICATIONS

Japanese Office Action dated Jun. 23, 2015 issued in Japanese Patent Application No. 2014-146950.

*Primary Examiner* — Tyler Paige

(57) ABSTRACT

A bicycle control device controls a motor to assist driving of a wheel of a bicycle. The bicycle control device includes an input unit and a controller that switches, when the input unit is operated, between a ride mode that controls the motor in correspondence with manual driving force and a walk mode that drives the motor in correspondence with the operation of the input unit. After switching to the walk mode, the controller drives the motor in correspondence with the operation of the input unit.

19 Claims, 7 Drawing Sheets

(56) References Cited

U.S. PATENT DOCUMENTS

| | | | |
|---|---|---|---|
| 2005/0177285 A1* | 8/2005 | Honda | B62M 7/12 701/22 |
| 2009/0218154 A1* | 9/2009 | Yee | B62M 6/60 180/220 |
| 2009/0242284 A1* | 10/2009 | Whetstone, Jr. | B62B 5/0026 180/19.2 |
| 2010/0263949 A1* | 10/2010 | Horn | B62D 51/02 180/14.1 |
| 2010/0282534 A1* | 11/2010 | Lin | B62M 6/65 180/206.6 |
| 2016/0016638 A1* | 1/2016 | Miyoshi | B62M 6/55 701/22 |

FOREIGN PATENT DOCUMENTS

| | | |
|---|---|---|
| JP | 07-143603 A | 6/1995 |
| JP | 08-127386 A | 5/1996 |
| JP | 09-002370 A | 1/1997 |
| JP | 09-123982 A | 5/1997 |
| JP | 09-263290 A | 10/1997 |
| JP | 10-167162 A | 6/1998 |
| JP | 10-203467 A | 8/1998 |
| JP | 10-250671 A | 9/1998 |
| JP | 10-324290 A | 12/1998 |
| JP | 11-059557 A | 3/1999 |
| JP | 11-124076 A | 5/1999 |
| JP | 2000-085675 A | 3/2000 |
| JP | 2000-095178 A | 4/2000 |
| JP | 2000-095179 A | 4/2000 |
| JP | 2000-095180 A | 4/2000 |
| JP | 2000-168672 A | 6/2000 |
| JP | 2003-095182 A | 4/2003 |
| JP | 2004-142633 A | 5/2004 |
| JP | 2012-030767 A | 2/2012 |
| JP | 2012-144061 A | 8/2012 |

* cited by examiner

BICYCLE CONTROL DEVICE, MOTOR ASSIST BICYCLE INCLUDING BICYCLE CONTROL DEVICE, AND METHOD OF CONTROLLING MOTOR OF MOTOR ASSIST BICYCLE

CROSS-REFERENCE TO RELATED APPLICATIONS

This application is based upon and claims the benefit of priority from prior Japanese Patent Application No. 2014-146950, filed on Jul. 17, 2014, the entire contents of which are incorporated herein by reference.

TECHNICAL FIELD

The present disclosure relates to a bicycle control device, a motor assist bicycle including a bicycle control device, and a method of controlling a motor of a motor assist bicycle.

BACKGROUND ART

Japanese Laid-Open Patent Publication No. 2012-144061 discloses a motor assist bicycle that drives a motor to assist driving of a wheel when pushing and walking the bicycle in addition to when riding the bicycle. The motor assist bicycle includes a walk switch. When the walk switch is pushed, a control device of the motor assist bicycle determines whether or not the rider is walking the bicycle from the depression force applied to the pedals and the rotation speed of the crankshaft. When the control device determines that the rider is walking the bicycle, the control device drives the motor in a predetermined drive mode, namely, a walk mode. The walk switch is also used as a switch that adjusts assist drive force during normal riding.

When the rider operates the switch during normal riding to adjust the auxiliary drive force, the motor may be driven in the walk mode even though the rider does not intend to do so.

SUMMARY

One aspect of the present disclosure is a bicycle control device that controls a motor to assist driving of a wheel of a bicycle. The bicycle control device includes an input unit and a controller configured to switch, when the input unit is operated, between a ride mode that controls the motor in correspondence with manual driving force and a walk mode that drives the motor in correspondence with the operation of the input unit. After switching to the walk mode, the controller is configured to drive the motor in correspondence with the operation of the input unit.

A further aspect of the present disclosure is a method of controlling a motor that assists driving of a wheel of a bicycle. The method includes, by a bicycle control device, switching, when an input unit is operated, between a ride mode that controls the motor in correspondence with driving force and a walk mode that drives the motor in correspondence with the operation of the input unit; and driving the motor in accordance with the operation of the input unit after switching to the walk mode.

Other aspects and advantages of the present disclosure will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF EMBODIMENTS

First Embodiment

A bicycle control device will now be described with reference to FIGS. 1 to 5.

In the description hereafter, the left side refers to the left side as viewed from a rider, who is riding a motor assist bicycle, and the right side refers to the right side as viewed from the rider on the bicycle. The front side refers to the front of the bicycle, and the rear side refers to the rear of the bicycle.

Figure 1:
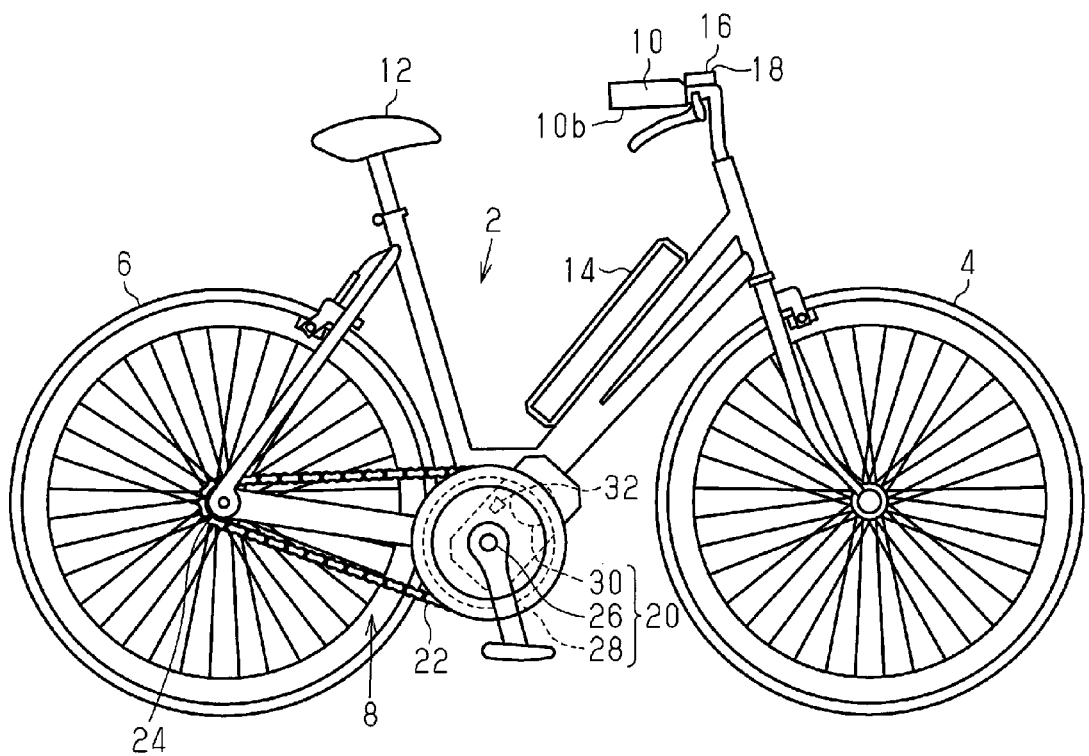
FIG. 1 is a schematic diagram of a motor assist bicycle.

FIG. 1 shows one example of a motor assist bicycle including a bicycle control device.

The motor assist bicycle includes a frame 2, two rotatable wheels (front wheel 4 and rear wheel 6) coupled to the frame 2, a drive mechanism 8 that drives the rear wheel 6, a handle 10 that turns the front wheel 4, a saddle 12, a battery 14, an operation unit 16, and a display 18.

The operation unit 16 and the display 18 are attached to, for example, the handle 10.

The battery 14 is coupled to, for example, the frame 2 or a rear carrier. Alternatively, the battery 14 may be coupled to both of the frame 2 and the rear carrier. The battery 14 supplies the drive mechanism 8 with electric power.

The drive mechanism 8 includes a crank unit 20, a chain 22 that transmits power from the crank unit 20, and a rear sprocket 24 rotatable with respect to the axle of the rear wheel 6 and coupled to the rear wheel 6 and driven by the chain 22. The crank unit 20 includes a crankshaft 26, a front sprocket 28 that transmits rotational force from the crankshaft 26 to the chain 22, and a motor 30 that assists the driving of the rear wheel 6.

A one-way clutch transmits rotational force from the crankshaft 26 to the front sprocket 28. When the crankshaft 26 is rotated in the forward direction, the one-way clutch transmits rotational force from the crankshaft 26 to the front sprocket 28. When the crankshaft 26 is rotated in the rearward direction, the one-way clutch does not transmit rotational force from the crankshaft 26 to the front sprocket 28. Rotation of the crankshaft 26 in the forward direction refers to rotation of the crankshaft 26 in the direction that moves the motor assist bicycle forward. The one-way clutch does not necessarily have to be arranged between the crankshaft 26 and the front sprocket 28. The omission of the one-way clutch allows for the operation of a coaster brake arranged in the hub of the rear wheel 6.

A speed reduction mechanism and a transmission mechanism transmit rotational force from the motor 30 to the chain 22. The speed reduction mechanism uses a set of gears to reduce the speed of the rotation generated by the output shaft of the motor 30 and transmit the rotation to the transmission mechanism. The transmission mechanism may be a sprocket that is engaged with the chain 22 or a gear mechanism that transmits rotational force to the crankshaft 26.

Figure 2:
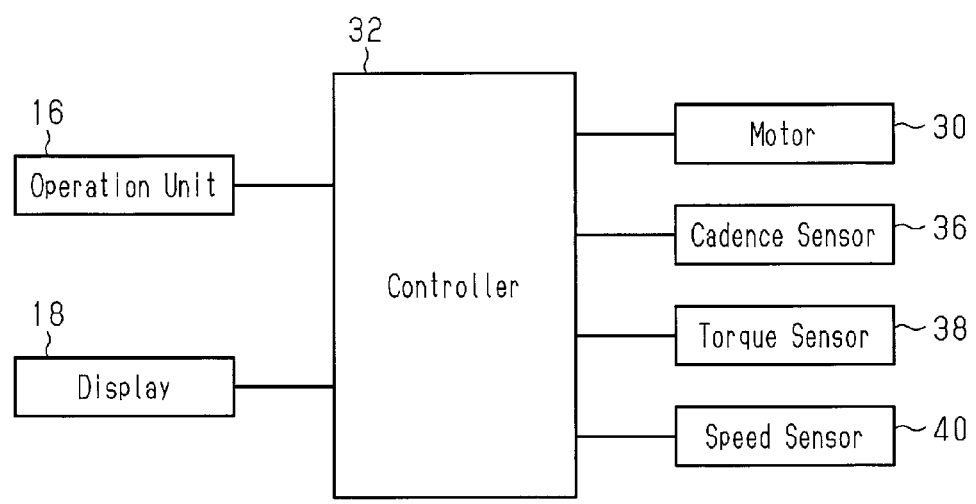
FIG. 2 is a block diagram of a bicycle control device.

FIG. 2 is a block diagram of the bicycle control device.

Figure 3:
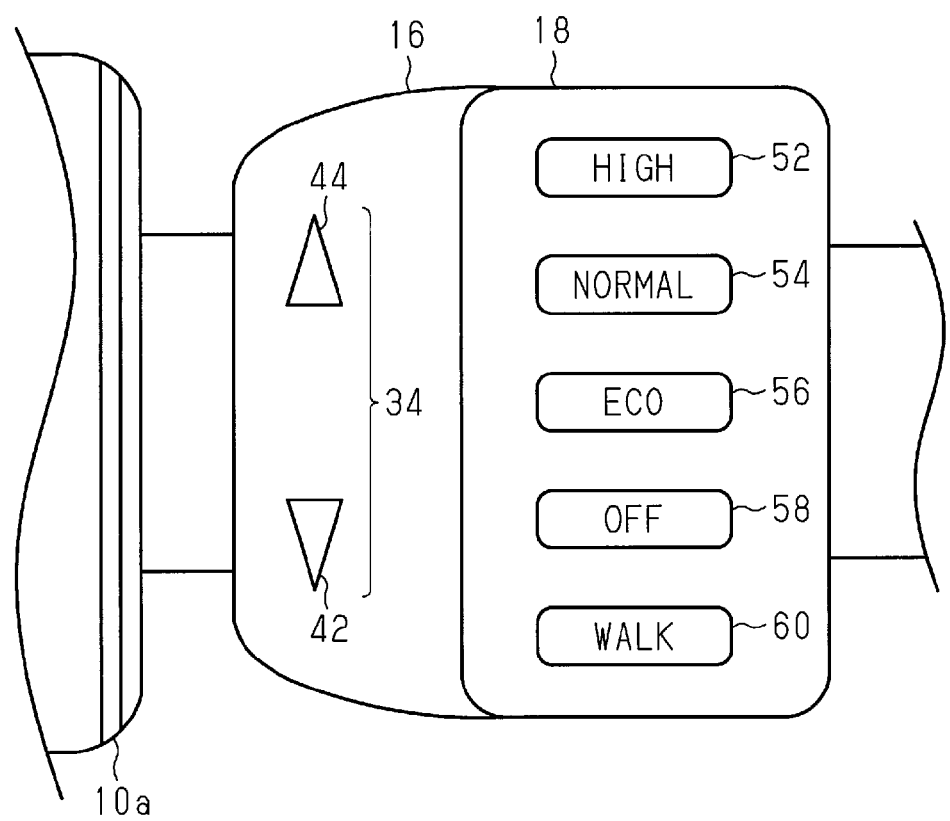
FIG. 3 is a schematic diagram of an operation unit and a display.

The bicycle control device includes a controller 32 and an input unit 34 (refer to FIG. 3). The input unit 34 provides the controller 32 with a signal when operated by the rider. The controller 32 is arranged in, for example, the crank unit 20. The controller 32 may include a microcomputer, a memory, and an inverter that drives the motor 30. Preferably, the memory includes a non-volatile memory.

The controller 32 is connected to the motor 30, a cadence sensor 36, a torque sensor 38, a speed sensor 40, the operation unit 16, and the display 18.

The cadence sensor 36, which is located in the crank unit 20, detects the rotation speed of the crankshaft 26 (number of rotations per minute, referred to as "the cadence" hereafter). The cadence sensor 36 may be, for example, a sensor that detects a magnet coupled to the crank arm.

The torque sensor 38 is located on the crank unit 20. A power transmission member that transmits rotational force from the crankshaft 26 to the front sprocket 28 is arranged in a transmission path between the crankshaft 26 and the front sprocket 28. The torque sensor 38 detects the actual torque generated at the power transmission member. Torque is related to the depression force (manual driving force) applied to the pedals of the motor assist bicycle.

The speed sensor 40 is located on a chain stay of the frame 2 and detects the rotation speed of the rear wheel 6. The speed sensor 40 may be, for example, a sensor that detects a magnet coupled to the wheel.

The speed sensor 40 may be configured to detect the rotation speed of the front wheel 4.

The controller 32 receives signals from the cadence sensor 36 to calculate the cadence. The calculated cadence may be shown on the display 18.

The controller 32 receives signals from the torque sensor 38 to calculate the torque. Further, the controller 32 receives signals from the speed sensor 40 to calculate the speed of the motor assist bicycle. The calculated bicycle speed may be shown on the display 18.

The controller 32 sets an assist force based on the bicycle speed and the torque and controls the motor 30 to generate torque corresponding to the assist force. The assist force is set based on a map, which is stored in advance.

The map indicates assist ratios in correspondence with bicycle speeds. The assist ratio shows the ratio of the assist force of the motor 30 relative to manual driving force. Such a map is set for each operation mode of the motor 30. The controller 32 may use an equation instead of a map to set the assist force. The operation modes of the motor 30 will now be described.

Description of Operation Modes

The controller 32 controls the motor 30 in a number of operation modes, which are classified into a number of ride modes and a walk mode. The ride modes are operation modes of the motor 30 when a rider rides the motor assist bicycle (hereinafter referred to as "the riding state"). More specifically, in the ride modes, the controller 32 drives the motor 30 in correspondence with the manual driving force. The walk mode is an operation mode of the motor 30 when the rider walks the motor assist bicycle (hereinafter referred to as "the walking state"). More specifically, in the walk mode, the controller 32 drives or stops the motor 30 in accordance with the operation of the input unit 34.

The ride modes include a normal mode and an off mode. In the normal mode, the motor 30 is driven. In the off mode, the motor 30 is not driven.

The ride modes also include a number of modes that generate different assist forces relative to the manual driving force. Preferably, the ride modes include a high mode and an economic (eco) mode. The high mode is an operation mode that generates a larger assist force than the normal mode when in a predetermined bicycle speed range. The eco mode is an operation mode that generates a smaller assist force than the normal mode when in a predetermined bicycle speed range. The walk mode is an operation mode that allows the motor 30 to be driven when in a walking speed range. In the walk mode, speed restriction control is performed. When the speed restriction control is performed while the motor 30 is being driven in the walk mode, the controller 32 stops driving the motor 30 if the bicycle speed becomes higher than or equal to a predetermined value. This keeps the bicycle speed lower than a predetermined value. The predetermined value is, for example, equal to the value that stops driving the motor 30. This limits the bicycle speed at the predetermined value.

Preferably, "the predetermined value" (upper limit value) is variable so that the motor assist bicycle can be used by different riders who walk at different speeds. A switch used to set the predetermined value is located on, for example, the operation unit 16. The predetermined value is selected, for example, from three to five km/h.

In the walk mode, a torque restriction control is performed. When the torque restriction control is performed while the motor 30 is driven in the walk mode, the controller 32 stops driving the motor 30 if the torque (manual driving force) becomes higher than or equal to a predetermined value. Thus, the motor 30 is not driven when the rider is pedaling.

FIG. 3 illustrates the display 18. The display 18 shows the operation modes of the motor 30. As shown in FIG. 3, the display 18 is located, for example, near a left grip 10a of the handle 10. The display 18 includes first to fifth lamps 52, 54, 56, 58, 60. The first lamp 52 is illuminated when the operation mode is the high mode. The second lamp 54 is illuminated when the operation mode is the normal mode. The third lamp 56 is illuminated when the operation mode is the eco mode. The fourth lamp 58 is illuminated when the operation mode is the off mode. The fifth lamp 60 is illuminated when the operation mode is the walk mode. The display 18 may be configured by, for example, an LED display or a liquid crystal display. When the display 18 is configured by a liquid crystal display, characters corresponding to the operation modes are shown instead of the first to fifth lamps 52, 54, 56, 58, and 60. In this case, the display 18 may show only characters indicating the selected operation mode. Alternatively, the display 18 may show characters indicating the selected operation mode differently from characters indicating the other operation modes.

Switching of Operation Modes

FIG. 3 shows the operation unit 16. The operation mode of the motor 30 is switched by operating the input unit 34. The operation unit 16 is located near a grip. In the present embodiment, the operation unit 16 is located near the left grip 10a and the display 18, that is, between the display 18 and the left grip 10a. The operation unit 16 includes two switches, which configure the input unit 34. The switches may be, for example, push button switches, touch switches, slide switches, or the like. In the present embodiment, the input unit 34 includes a first operation switch 42 and a second operation switch 44. When the operation unit 16 is attached to the handle 10, the first operation switch 42 is located below the second operation switch 44.

The first operation switch 42 and the second operation switch 44 each send an operation signal to the controller 32 when operated. The first operation switch 42 and the second operation switch 44 each output an operation signal whenever pushed. The controller 32 receives operation signals from the first operation switch 42 and operation signals from the second operation switch 44 and switches operation modes of the motor 30 based on the operation signals.

When the controller 32 receives an operation signal from the first operation switch 42 in a ride mode (high mode or normal mode or eco mode), the controller 32 basically switches the operation mode to one that decreases the assist force.

When the controller 32 receives an operation signal from the second operation switch 44 in a ride mode (normal mode or eco mode or off mode), the controller 32 basically switches the operation mode to one that increases the assist force.

When a predetermined switch operation is performed in a ride mode, the controller 32 switches the operation mode from the ride mode to the walk mode. The processing of mode switching will now be described.

Figure 4:
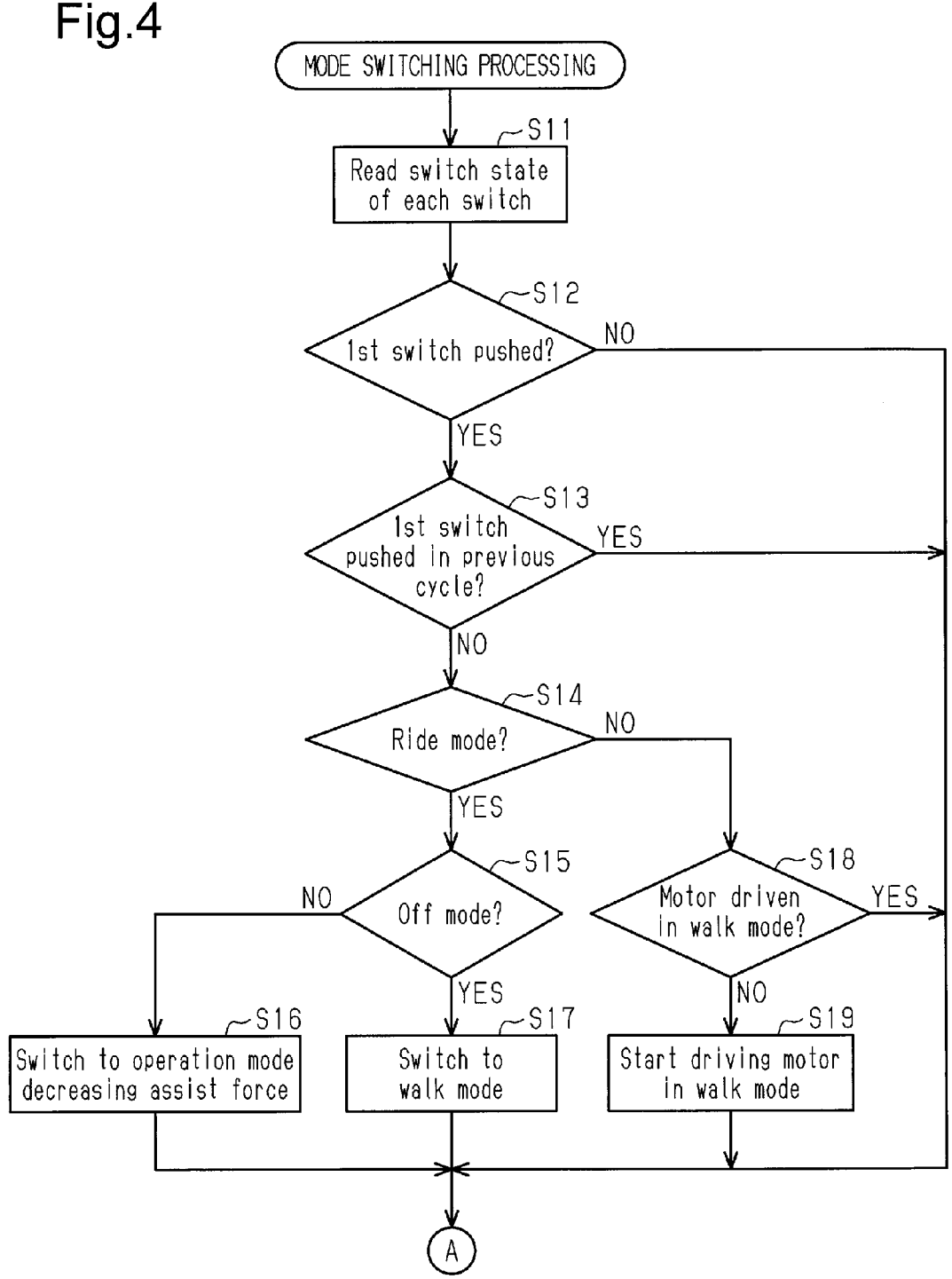
FIGS. 4 and 5 is a flowchart illustrating the processing of mode switching.
Figure 5:
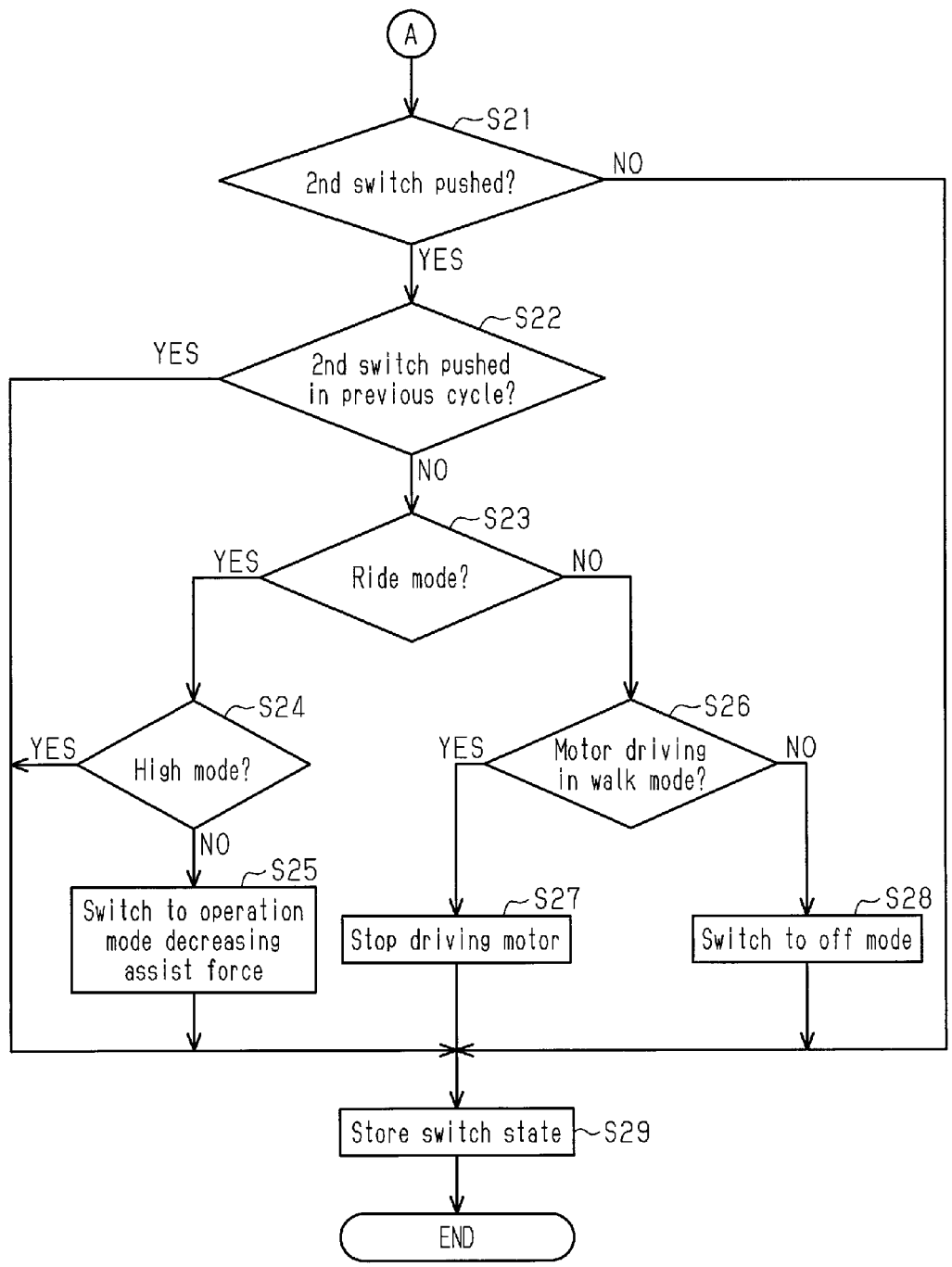

FIGS. 4 and 5 are flowcharts showing one example for processing mode switching. The flowchart of FIG. 5 continues from the flowchart of FIG. 4. The encircled character A in FIG. 4 is continuous with the encircled character A in FIG. 5.

FIG. 4 shows the processes the controller 32 performs when the first operation switch 42 is pushed, and FIG. 5 shows the processes the controller 32 performs when the second operation switch 44 is pushed. When processing mode switching, the controller 32 first performs various operations based on the pushed state of the first operation switch 42 and then performs various processes based on the pushed state of the second operation switch. The controller 32 repeats the mode switching processing in predetermined cycles.

The processes performed when the first operation switch 42 is pushed (steps S11 to S19) will now be described with reference to FIG. 4. In step S11, the controller 32 reads the pushed state of the first operation switch 42 and the pushed state of the second operation switch 44. For example, when receiving an operation signal (signal indicating pushed state) from the first operation switch 42, the controller 32 determines that the first operation switch 42 is in a pushed state. When an operation signal is not received from the first operation switch 42, the controller 32 determines that the first operation switch 42 is not in a pushed state. When receiving an operation signal (signal indicating pushed state) from the second operation switch 44, the controller 32 determines that the second operation switch 44 is in a pushed state. When an operation signal is not received from the second operation switch 44, the controller 32 determines that the second operation switch 44 is not in a pushed state.

In step S12, the controller 32 determines whether or not the first operation switch 42 is in a pushed state. When determining that the first operation switch 42 is in the pushed state (YES), the controller 32 proceeds to step S13. When determining that the first operation switch 42 is not in the pushed state (NO), the controller 32 proceeds to step S21 to perform processes related to the second operation switch 44.

In step S13, the controller 32 reads the state of the first operation switch 42 in the previous cycle and determines whether or not the first operation switch 42 was in a pushed state. If the first operation switch 42 was not in a pushed state in the previous cycle (NO), the controller 32 proceeds to step S14. If the first operation switch 42 was in a pushed state in the previous cycle (YES), the controller 32 proceeds to step S21 to perform processes related to the second operation switch 44.

In steps S11 to S13, the controller 32 determines whether or not the first operation switch 42 that was not operated has now been operated. When the first operation switch 42 that was not operated has been operated, the controller 32 switches the operation mode through subsequent processes.

In step S14, the controller 32 determines whether or not the operation mode is a ride mode. When determining that the operation mode is a ride mode (YES), the controller 32 proceeds to step S15. When determining that the operation mode is not a ride mode, that is, the operation mode is the walk mode (NO), the controller 32 proceeds to step S18.

In step S15, the controller 32 determines whether or not the operation mode is in the off mode. When determining that the operation mode is one other than the off mode (NO), the controller 32 proceeds to step S16. When determining that the operation mode is the off mode in step S15 (YES), the controller 32 proceeds to step S17.

In step S16, the controller 32 basically switches the operation mode to one that decreases the assist force. For example, when the operation mode is the high mode, the controller 32 switches the operation mode to the normal mode. When the operation mode is the normal mode, the controller 32 switches the operation mode to the eco mode. When the operation mode is the eco mode, the controller 32 switches the operation mode to the off mode.

In step S17, the controller 32 switches the operation mode from the off mode to a walk mode standby condition. When in a walk mode standby condition, the controller 32 waits for a command that drives the motor 30 in the walk mode. Thus, the motor 30 is stopped in step S17.

In step S18, the controller 32 determines whether or not the motor 30 is being driven in the walk mode. In the walk mode, the motor 30 is in a drive condition, in which the controller 32 is driving the motor 30, or a standby condition, in which the controller 32 is waiting for a command to drive the motor 30. In step S18, the controller 32 determines which one of these conditions the controller 32 is in.

When the controller 32 is not driving the motor 30 in the walk mode (NO), the controller 32 proceeds to step S19 and drives the motor 30 in the walk mode. When the controller 32 is driving the motor 30 in the walk mode (YES), the controller 32 proceeds to step S21 to perform processes related to the second operation switch 44.

The processes of steps S14 to S19 leads to the following results. If the operation mode is a ride mode other than the off mode, the controller 32 switches the operation mode to one that decreases the assist force when the first operation switch 42 is pushed. If the operation mode is the off mode, the controller 32 switches the operation mode from the off mode to the walk mode when the first operation switch 42 is pushed. When switching to the walk mode, the controller 32 does not drive the motor 30. Rather, the controller 32 is in a standby condition and waits for the next command. If the operation mode is the walk mode and the motor 30 is stopped, the controller 32 drives the motor 30 when the first operation switch 42 is pushed. If the operation mode is the walk mode and the motor 30 is being driven, the controller 32 does not change the operation mode of the motor 30 when the first operation switch 42 is pushed. If the operation mode is the walk mode and the motor 30 is being driven, the controller 32 continues to drive the motor 30 without changing the operation mode as long as the first operation switch 42 and the second operation switch 44 are both not pushed.

Processes based on the state of the second operation switch 44 (steps S21 to S29) will now be described with reference to FIG. 5. In step S21, the controller 32 determines whether or not the second operation switch 44 is in the pushed state. When determining that the second operation switch 44 is in the pushed state (YES), the controller 32 proceeds to step S22. When determining that the second operation switch 44 is not in the pushed state (NO), the controller 32 proceeds to step S29. In step S29, the controller 32 stores the state of the second operation switch 44 in a memory. When the processing of mode switching is performed the next time, the state of each switch stored in step S29 is read as the switch state of the previous cycle.

In step S22, the controller 32 reads the state of the second operation switch 44 in the previous cycle from the memory and determines whether or not the second operation switch 44 was in a pushed state. If the second operation switch 44 was not in a pushed state in the previous cycle (NO), the controller 32 proceeds to step S23. If the second operation switch 44 was in a pushed state in the previous cycle (YES), the controller 32 proceeds to step S29.

In steps S21 and S22, the controller 32 determines whether or not the second operation switch 44 that was not operated has now been operated. When the second operation switch 44 that was not operated has been operated, the controller 32 switches the operation mode through subsequent processes (steps S23 to S26 and S28).

In step S23, the controller 32 determines whether or not the operation mode is a ride mode. When determining that the operation mode is a ride mode (YES), the controller 32 proceeds to step S24. When determining that the operation mode is not a ride mode, that is, the operation mode is the walk mode (NO), the controller 32 proceeds to step S26.

In step S24, the controller 32 determines whether or not the operation mode is the high mode. When determining that the operation mode is one other than the high mode (NO), the controller 32 proceeds to step S25. When determining that the operation mode is the high mode in step S24 (YES), the controller 32 proceeds to step S29.

In step S25, the controller 32 switches the operation mode to one that increases the assist force. For example, when the operation mode is the off mode, the controller 32 switches the operation mode to the eco mode. When the operation mode is the eco mode, the controller 32 switches the operation mode to the normal mode. When the operation mode is the normal mode, the controller 32 switches the operation mode to the high mode.

In step S26, the controller 32 determines whether or not the motor 30 is being driven in the walk mode. In the walk mode, the motor 30 is in a drive condition, in which the controller 32 is driving the motor 30, or a standby condition, in which the controller 32 is waiting for a command to drive the motor 30. In step S26, the controller 32 determines which one of these conditions the controller 32 is in. When the controller 32 is driving the motor 30 in the walk mode (YES), the controller 32 proceeds to step S27 and stops driving the motor 30. When the motor 30 is not driven in the walk mode (NO), the controller 32 proceeds to step S28 and switches the operation mode to the off mode.

The processes of steps S23 to S28 leads to the following results. If the operation mode is the high mode, the controller 32 does not change the operation mode of the motor 30 when the second operation switch 44 is pushed. If the operation mode is a ride mode other than the high mode, the controller 32 switches the operation mode to one that increases the assist force when the second operation switch 44 is pushed. If the operation mode is the walk mode and the motor 30 is being driven, the controller 32 stops driving the motor 30 when the second operation switch 44 is pushed. If the operation mode is the walk mode and the motor 30 is not being driven, the controller 32 switches the operation from the walk mode to the off mode.

The bicycle control device and the motor assist bicycle have the advantages described below in the present embodiment.

When switched to the walk mode, the controller 32 drives and stops the motor 30 in accordance with the operation of the input unit 34. Thus, when the rider walks the bicycle, the driving of the wheel is assisted as intended by the rider.

In the walk mode, the motor 30 is not driven unless the first operation switch 42 is operated twice. Thus, even if the operation mode is switched from the ride mode to the walk mode, the motor 30 is not driven immediately. Once the driving of the motor 30 starts in the walk mode, the motor 30 is continuously driven without the need to keep pushing the first operation switch 42.

A single switch has two operation functions. That is, the first operation switch 42 has a function for switching ride modes and a function for driving the motor 30 in the walk mode. This decreases the number of components in the operation unit 16 as compared with when a switch is provided for each function.

When the speed of the motor assist bicycle becomes higher than or equal to the predetermined value (upper limit value) in the walk mode, the controller 32 stops driving the motor 30. This limits the speed of the motor assist bicycle so that the bicycle speed does not exceed the walking speed of the rider.

Second Embodiment

Figure 6:
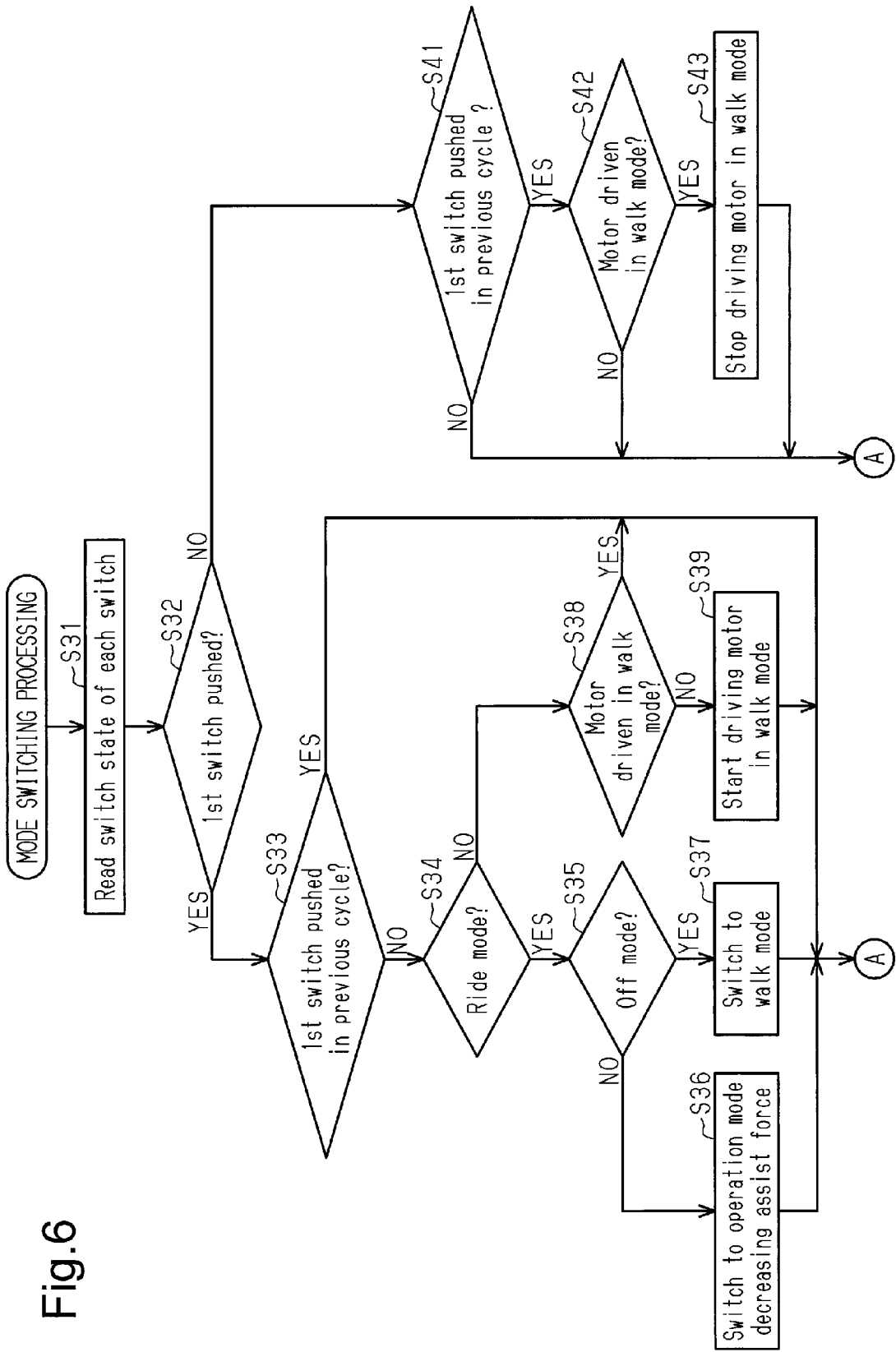
FIG. 6 is a flowchart illustrating the processing of mode switching in a modified example.

The controller 32 in a further embodiment will now be described with reference to FIG. 6. In the present embodiment, the controller 32 has the same configuration as the controller 32 of the first embodiment. In the description hereafter, same reference numerals are given to those components that are the same as the corresponding components of the first embodiment.

The controller 32 of the present embodiment differs from the controller 32 of the first embodiment in the processing of mode switching. In particular, the processes related with the first operation switch 42 differ from the first embodiment. The processes related with the second operation switch 44 are the same as the first embodiment and thus will not be described below. The encircled characters A in FIG. 6 are continuous with the encircled character A in FIG. 5. The processes related with the first operation switch 42 will now be described.

The controller 32 of the present embodiment performs the same processes as the first embodiment when the first operation switch 42 was in a pushed state in the previous cycle and is in a pushed state in the present cycle. More specifically, steps S31 to S39 in FIG. 6 of the present embodiment are the same as steps S11 to S19 of the first embodiment. Thus, steps S31 to S39 will not be described below. When the first operation switch 42 is not in a pushed state in the present cycle, predetermined processes are performed based on the state of the switch 42 in the present cycle. This differs from the first embodiment.

In step S32, when determining that the first operation switch 42 is not in a pushed state, the controller 32 proceeds to step S41.

In step S41, the controller 32 reads the state of the first operation switch 42 in the previous cycle and determines whether or not the first operation switch 42 was in a pushed state in the previous cycle. When the first operation switch 42 was not in the pushed state in the previous cycle (NO), the controller 32 proceeds to step S21. When the first operation switch 42 was in the pushed state in the previous cycle (YES), the controller 32 proceeds to step S42 and determines whether or not the motor 30 is being driven in the walk mode.

When the controller 32 is not driving the motor 30 in the walk mode (NO), the controller 32 proceeds to step S21 and performs processes related with the second operation switch 44. When the controller 32 is driving the motor 30 in the walk mode (YES), the controller 32 proceeds to step S43 and stops driving the motor 30.

The processes of steps S41 to S43 leads to the following results. If the operation mode is the walk mode and the motor 30 is being driven, the controller 32 stops driving the motor 30 when the pushed first operation switch 42 is released, that is, when the operated first operation switch 42 is no longer operated. If the operation mode is the walk mode and the motor 30 is being driven, the controller 32 does not change the operation mode as long as the first operation switch 42 remains pushed (YES in step S33). In this manner, the drive state of the motor 30 is maintained by continuously pushing the first operation switch 42.

In the present embodiment, the motor 30 remains driven in the walk mode by keeping the first operation switch 42 in the pushed state. When the first operation switch 42 is released from the pushed state, the motor 30 is no longer driven in the walk mode.

The advantages of the bicycle control device in the present embodiment will now be described.

The assistance provided by the motor 30 may be cancelled just by stopping the operation of the first operation switch 42.

Third Embodiment

Figure 7:
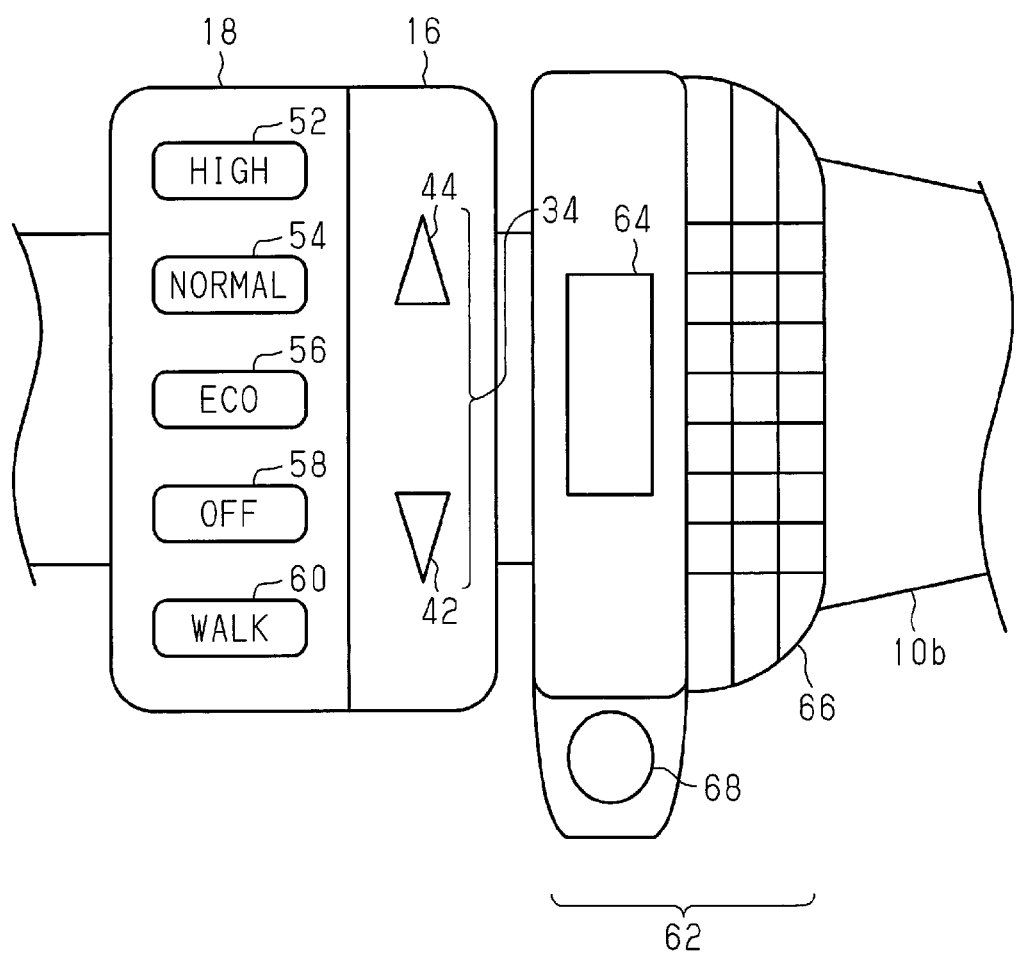
FIG. 7 is a schematic diagram of an operation unit and a display in a modified example.

The operation unit 16 and the display 18 in a further embodiment will now be described with reference to FIG. 7. In the present embodiment, components of the operation unit 16 and the display 18 that have the same configuration as the first embodiment will not be described. In the first embodiment, the input unit 34 is independent from other devices, whereas in the present embodiment, a gearshift operation unit 62 includes functions of the operation unit 16 serving as the input unit 34.

The operation unit 16 includes the second operation switch 44 and the first operation switch 42, which form the input unit 34. The second operation switch 44 and the first operation switch 42 have the same functions as the second operation switch 44 and the first operation switch 42 of the first embodiment. Although the second operation switch 44 and the first operation switch 42 allow operation modes to be changed, the second operation switch 44 and the first operation switch 42 cannot be used to drive and stop the motor 30.

The gearshift operation unit 62 includes a gearshift switch 66 and a third operation switch 68. The gearshift switch 66 is used to change the gear ratio in a derailleur of the bicycle. The gearshift operation unit 62 includes a display 64 that shows a gear number, which corresponds to the gear ratio of the derailleur. The third operation switch 68 is located near the gearshift operation unit 62. Preferably, the third operation switch 68 is arranged within a range reached by the thumb of the rider when the rider is gripping the grip of the handle 10. This allows the rider to operate the third operation switch 68 while gripping the grip. In the present embodiment, the gearshift operation unit 62 is attached to the handle 10 near a right grip 10b.

The third operation switch 68 is a switch used to drive and stop the motor 30 in the walk mode. The controller 32 receives an operation signal from the third operation switch 68 during only the off mode and the walk mode. The controller 32 acknowledges the operation of the third operation switch 68 as being the same as the operation of the first operation switch 42. Thus, the controller 32 performs a process corresponding to the operation of the first operation switch 42 when processing mode switching. For example, the third operation switch 68 performs mode switching processing in the same manner as the first and second embodiments when the third operation switch 68 is operated.

If the operation mode is the off mode, the controller 32 switches the operation mode to the walk mode when the third operation switch 68 is pushed. In this case, the controller 32 enters a standby state and waits for the next command without driving the motor 30. If the operation mode is the walk mode and the motor 30 is stopped, the controller 32 drives the motor 30 when the third operation switch 68 is pushed. If the operation mode is the walk mode and the motor 30 is being driven, the controller 32 stops driving the motor 30 when the pushed third operation switch 68 is released.

If the third operation switch 68 is continuously pushed when the operation mode is the walk mode and the motor 30 is being driven, the controller 32 does not change the operation mode. In this manner, the drive state of the motor 30 is maintained by continuously pushing the third operation switch 68.

The controller 32 permits or restricts the shifting of gears with the gearshift switch 66 depending on the operation mode. For example, when in a ride mode, the controller 32 permits the shifting of gears with the gearshift switch 66. When in the walk mode, the controller 32 prohibits the shifting of gears with the gearshift switch 66. Since gears cannot be changed when the rider is walking the bicycle, sudden changes in the bicycle speed are limited.

In the present embodiment, the switch for changing the operation mode is arranged independently from the switch for driving the motor 30 in the walk mode. This allows the switch for driving the motor 30 in the walk mode to be located at a position where the switch can easily be operated when walking the bicycle.

In the first and second embodiments, if the operation mode is the off mode when the first operation switch 42 is operated, the controller 32 switches the operation mode to the walk mode (step S15 and step S35). The operation mode may be switched to the walk mode when certain conditions are satisfied. For example, when the operation mode is the off mode, the controller 32 switches the operation mode to the walk mode when the first operation switch 42 is pushed over a predetermined time or longer. This limits switching of the operation mode from the off mode to the off mode when the rider does not intend to do so.

Preferably, in the first embodiment and the second embodiment, the bicycle control device is configured as described below. When the power is turned off in the walk mode and subsequently turned on, the controller 32 controls the motor 30 to be in a ride mode (e.g., normal mode or off mode). Alternatively, regardless of the operation mode when the power is turned off, the controller 32 may control the motor 30 to be in a ride mode (e.g., normal mode or off mode) when the power is subsequently turned on. In this case, when the power is turned on to use the motor assist bicycle, the operation mode is always in a ride mode. This allows the rider to always use the motor assist bicycle in the ride mode when commencing use of the bicycle.

Figure 8:
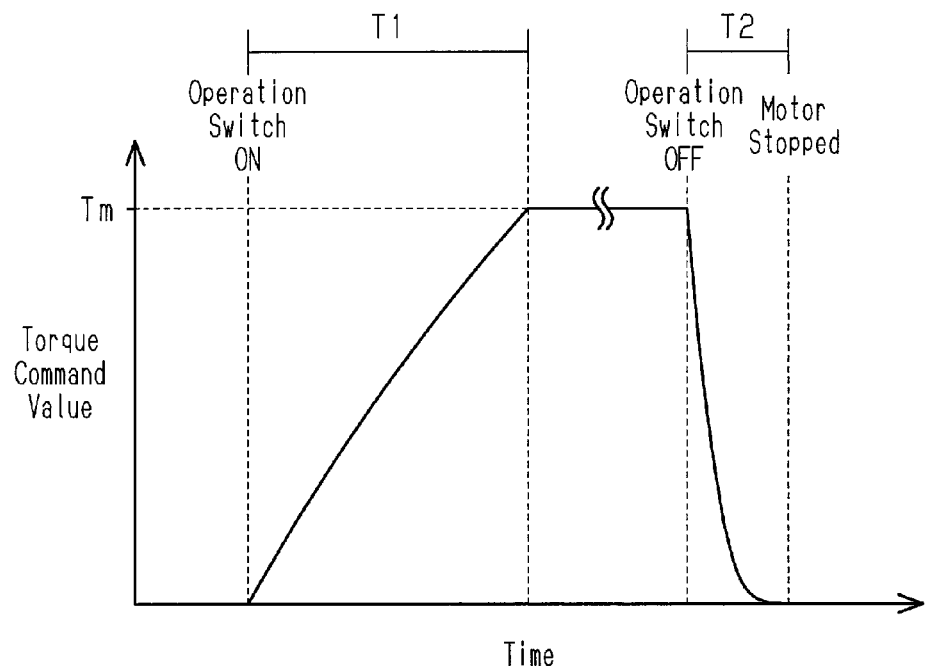
FIG. 8 is a waveform chart of a torque command value that corresponds to the operation of a walk switch.

Preferably, in each of the above embodiments, the controller 32 gradually raises a torque command value that is used to drive the motor 30 when starting the driving of the motor 30 based on the first operation switch 42 or the third operation switch 68 (refer to FIG. 8). The torque command value is, for example, a current value provided to the motor 30. This allows the bicycle to start moving smoothly when driving the motor 30 in the walk mode. The time T1 until the torque command value output from the controller 32 becomes maximal is selected from one to five seconds and is, for example, three seconds.

Preferably, in each of the above embodiments, when in the walk mode, the controller 32 controls the motor 30 so that the output torque of the motor 30 is less than or equal to a predetermined torque value Tm (refer to FIG. 8). The predetermined torque value Tm is selected to limit increases in the speed of the bicycle when, for example, walking the bicycle uphill. This restricts the output torque of the motor 30 even when the speed does not reach a predetermined speed. As a result, the speed of the bicycle is limited, which is driven by the motor 30.

Preferably, in each of the above embodiments, when stopping the motor 30 based on the first operation switch 42 or the third operation switch 68, the controller 32 gradually decreases the torque command value used to drive the motor 30 (refer to FIG. 8). The torque command value is, for example, a current value. The time T2 until the torque command value output from the controller 32 becomes minimal (0) is selected from fifty milliseconds to one second. This limits reverse rotation of the crankshaft 26 when driving or stopping the motor 30 in the walk mode.

Preferably, in each of the above embodiments, the controller 32 stops driving the motor 30 if the rotation speed of the wheel becomes less than or equal to a predetermined value when the motor 30 is driven in the walk mode. The predetermined value is, for example, zero. When, for example, applying the brakes of the bicycle, the rotation speed of the wheel decreases even when the motor 30 is driven. Accordingly, even when assisted by the motor 30 while walking the bicycle, the motor 30 can easily be stopped when applying the brakes of the bicycle. When the predetermined value is a value that is greater than zero, the controller 32 controls the motor 30 to gradually decrease the output of the motor 30 when stopping the motor 30.

Figure 9:
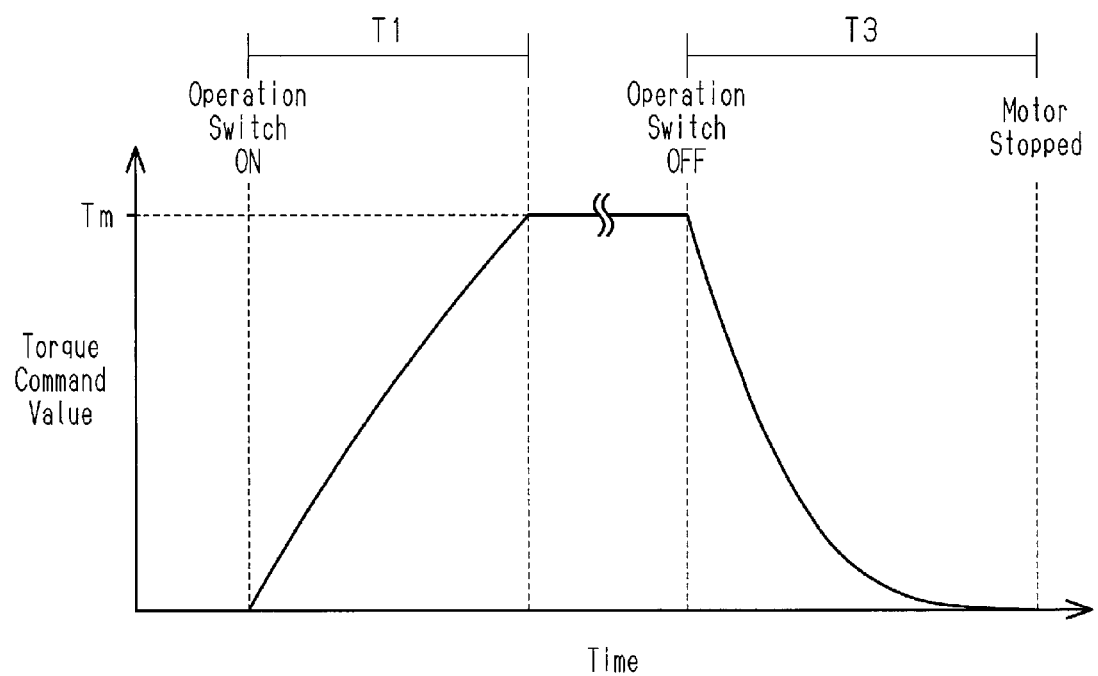
FIG. 9 is a waveform chart of a torque command value when forcibly stopping the motor while walking the bicycle.

Preferably, in each of the above embodiments, if load that is greater than a predetermined value acts on the motor 30 when the motor is driven in the walk mode, the controller 32 forcibly stops the motor 30. Preferably, the controller 32 gradually decreases the torque command value used to drive the motor 30 when stopping the motor 30 (refer to FIG. 9). The time until the torque command value output from the controller 32 becomes minimal (0) is selected from one to twenty seconds. The selected time is, for example, five seconds. This allows the rider to recognize a decrease in the assist force and cope with such a situation even if the motor 30 is stopped when walking the bicycle along a road (e.g., steep uphill) that applies a high load to the motor 30.

In the third embodiment, the third operation switch 68 is located near the right grip 10b of the handle 10 but may be located near the left grip 10a.

In each of the above embodiments, the displays 18 and 64 may be separate from the operation unit 16. In this case, the displays 18 and 64 may be located, for example, at the middle portion of the handle 10.

In each of the above embodiments, the display state of the displays 18 and 64 when the motor 30 is stopped in the walk mode may be changed from that when the motor 30 is driven. For example, the fifth lamp 60 is continuously illuminated when the motor 30 is stopped, and the fifth lamp 60 is intermittently illuminated when the motor 30 is driven. Alternatively, the color of the fifth lamp 60 may be changed. If the displays 18 and 64 are formed by liquid crystal displays, the displayed characters when the motor 30 is stopped may be changed from the displayed characters when the motor 30 is driven.

The microcomputer of the controller 32 is one example of a computer processor configured to execute control program(s) or control method(s) as illustrated in the drawings. The memory of the controller 32 is one example of a non-transitory computer-readable recording medium having stored thereon, a program or computer-executable instructions. Such computer-readable recording medium can be any available media that can be accessed by a general purpose or special purpose computer such as the computer processor of the controller 32. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

It should be apparent to those skilled in the art that the present invention may be embodied in many other specific forms without departing from the scope of the invention. Therefore, the present examples and embodiments are to be considered as illustrative and not restrictive, and the invention is not to be limited to the details given herein, but may be modified within the scope and equivalence of the appended claims.

The invention claimed is:

1. A bicycle control device that controls a motor to assist driving of a wheel of a bicycle, the bicycle control device comprising:
    an input unit including at least a first operation switch and a second operation switch that are different from a pedal of the bicycle; and
    a controller configured to switch, when the input unit is operated, between a ride mode that controls the motor in correspondence with manual driving force and a walk mode that drives the motor in correspondence with the operation of the input unit;
    wherein after switching to the walk mode in response to a user's input to the input unit, the controller is configured to drive the motor in correspondence with the operation of the input unit.

2. The bicycle control device according to claim 1, wherein
    when the first operation switch is operated in the ride mode, the controller is configured to switch from the ride mode to the walk mode;
    when the second operation switch is operated in the walk mode, the controller is configured to switch from the walk mode to the ride mode;
    when the first operation switch is operated in the walk mode after being operated to switch to the walk mode, the controller is configured to drive the motor.

3. The bicycle control device according to claim 2, wherein the controller is configured to drive the motor only while the first operation switch is operated when in the walk mode.

4. The bicycle control device according to claim 1, wherein when the first operation switch is operated in the walk mode, the controller is configured to drive the motor until the second operation switch is operated.

5. The bicycle control device according to claim 1, wherein when the first operation switch is operated for a predetermined time or longer in the ride mode, the controller is configured to switch from the ride mode to the walk mode.

6. The bicycle control device according to claim 1, wherein
the input unit includes at least a third operation switch and a fourth operation switch,
the third operation switch is used to switch to the walk mode, and
the fourth operation switch is used for a function other than switching modes.

7. The bicycle control device according to claim 6, wherein
the operation switch is a gearshift switch,
the controller is configured to control a derailleur based on the fourth operation switch when in the ride mode, and
the controller is configured to restrict gear shifting based on the fourth operation switch when in the walk mode.

8. The bicycle control device according to claim 1, wherein
the ride mode includes a first ride mode in which the controller has the motor output assist force in correspondence with the manual driving force and a second ride mode in which the controller does not have the motor output the assist force;
when the first operation switch is operated in the first ride mode, the controller is configured to switch to the second ride mode; and
when the first operation switch is operated in the second ride mode, the controller is configured to switch to the walk mode.

9. The bicycle control device according to claim 8, wherein
the first ride mode includes assist modes of different assist forces relative to the manual driving force, and
when the first operation switch and the second operation switch are operated in the ride mode, the controller is configured to switch between the assist modes.

10. The bicycle control device according to claim 1, wherein the controller is configured to stop the motor when the manual driving force becomes greater than or equal to a predetermined value in the walk mode.

11. The bicycle control device according to claim 1, wherein the controller is configured to stop the motor when a speed of the bicycle becomes greater than or equal to a predetermined value in the walk mode.

12. The bicycle control device according to claim 1, wherein when the motor is driven in the walk mode, the controller is configured to drive the motor so that a speed of the bicycle becomes less than or equal to a predetermined value.

13. The bicycle control device according to claim 11, wherein the predetermined value is variable.

14. The bicycle control device according to claim 1, wherein when a rotation speed of a wheel becomes lower than or equal to a predetermined value while the motor is driven in correspondence with the operation of the input unit, the controller is configured to stop the motor.

15. The bicycle control device according to claim 14, wherein the controller is configured to control the motor so as to gradually decrease output of the motor when stopping the motor.

16. A motor assist bicycle comprising:
a motor; and
the bicycle control device according to claim 1 configured to control the motor.

17. A method of controlling a motor that assists driving of a wheel of a bicycle, the method comprising, by a bicycle control device:
switching, when an input unit is operated, between a ride mode that controls the motor in correspondence with manual driving force and a walk mode that drives the motor in correspondence with the operation of the input unit, wherein the input unit includes at least a first operation switch and a second operation switch that are different from a pedal of the bicycle; and
driving the motor in accordance with the operation of the input unit after switching to the walk mode in response to a user's input to the input unit.

18. The method according to claim 17, further comprising driving, after the first operation switch is operated to switch to the walk mode, the motor when the first operation switch is operated again in the walk mode.

19. The method according to claim 17, further comprising controlling, when power is turned off in the walk mode and turned on again, the motor in the ride mode.

* * * * *